United States Patent
Guilino et al.

(10) Patent No.: US 6,231,182 B1
(45) Date of Patent: May 15, 2001

(54) MONOFOCAL OPHTHALMIC LENS HAVING TWO ASPHERICAL SURFACES

(75) Inventors: Gunther Guilino; Herbert Pfeiffer; Walter Haimerl, all of Munich; Helmut Altheimer, Baisweil; Gregor Esser, Haar, all of (DE)

(73) Assignee: Optische Werke G. Rodenstock, Munich (DE)

( * ) Notice: Subject to any disclaimer, the term of this patent is extended or adjusted under 35 U.S.C. 154(b) by 0 days.

(21) Appl. No.: 09/469,618

(22) Filed: Dec. 22, 1999

Related U.S. Application Data

(63) Continuation-in-part of application No. 08/875,206, filed as application No. PCT/DE96/02039 on Oct. 25, 1996, now abandoned.

(30) Foreign Application Priority Data

Oct. 28, 1995 (DE) .................................. 195 40 186

(51) Int. Cl.[7] ................................................... G02C 7/02
(52) U.S. Cl. ............................................ 351/159; 351/176
(58) Field of Search .................................. 351/159, 176, 351/160 R, 160 H, 41

(56) References Cited

U.S. PATENT DOCUMENTS

| | | | | |
|---|---|---|---|---|
| 5,050,979 | * | 9/1991 | Shinohara | 351/159 |
| 5,050,980 | * | 9/1991 | Shinohara | 351/159 |
| 5,353,072 | * | 10/1994 | Tejima et al. | 351/159 |
| 5,825,454 | * | 10/1998 | Yamakaji et al. | 351/159 |
| 6,012,813 | * | 1/2000 | Qi | 351/176 |

* cited by examiner

Primary Examiner—Georgia Epps
Assistant Examiner—Jordan M. Schwartz
(74) Attorney, Agent, or Firm—Antonelli, Terry, Stout & Kraus, LLP

(57) ABSTRACT

A monofocal ophthalmic lens having a front and a rear surface, each of which is aspherical, of which at least one surface has identical radii of principle curvature in the apex. The average surface refracting power of at least one of the front and rear surfaces is defined by the formula:

$$B_f = (n-1)/2 * (1/R_1 + 1/R_2)$$

wherein
- n: is the refractive index of the lens medium,
- $R_1$: is the radius of principle curvature 2 in a point of at least one of the front and rear surfaces in a first principle plane, and
- $R_2$: is the radius of principle curvature 2 in the point of the at least one in the front and rear surfaces in a second principle plane, and wherein the average surface refracting power of points on the at least one of the front and rear surfaces is the function of the distance h at constant azimuthal angle of Ω of each point from the apex, and the function includes an extreme value and/or a value 0.

20 Claims, 2 Drawing Sheets

MONOFOCAL OPHTHALMIC LENS HAVING TWO ASPHERICAL SURFACES

CROSS REFERENCE TO RELATED APPLICATION

This is a continuation-in-part of U.S. application Ser. No. 08/875,206, filed Oct. 21, 1997, now abandoned, the subject matter of which is a 371 of PCT/DE96/02039 filed Oct. 25, 1996, which is incorporated by reference herein.

TECHNICAL FIELD

The present invention relates to a monofocal ophthalmic lens having two aspherical surfaces.

STATE OF THE ART

An ophthalmic lens of this type is known from Example 7 of EP 0560 999 A1. The described ophthalmic lens has a rotationally symmetrical aspherical surface, thus a surface which has identical principle radii of curvature in the apex, as well as a so-called atoric surface, thus a surface which also has astigmatic power in addition to so-called spherical power. EP 0 560 999 A1 deals essentially with reducing the lens thickness of ophthalmic lenses having astigmatic power while at the same time reducing aberrations.

Although the influence of terms of a high order on the dependence of the radius of curvature of a meridian on the distance from the apex is discussed in connection to FIG. 5 of this printed publication, this figure indicates that according to EP 0 560 999 A1, the terms of a higher order are selected in such a manner that they do not noticeably influence the actual ophthalmic lens surface.

Even if the ophthalmic lens is ground to fit currently "unmodern" drop-shaped frames, no distance on the ophthalmic lens exceeds 35 mm from the apex. However, FIG. 5 of EP 0 560 999 A1 indicates that according to this printed publication the higher terms have no noticeable effect until over approximately 40 mm.

As an element of the present invention it was recognized that the maximum potential reduction in thickness and aberration is not exploited on the basis of the EP 0 560 999 A1 concept.

An aspherical ophthalmic lens having, solely, positive refractive power, in which the front surface is designed aspherically and the side facing the eye is designed spherically or torically in a conventional manner is known from EP 0 379 976 B1. This printed publication states that it is advantageous for reducing the center thickness while maintaining good optical imaging properties if the first derivation of the curvature after the distance from the apex first diminishes with increasing distance from the apex and then increases. However, this teaching overlooks that both the optical effect, i.e. the refractive power respectively the refracting power, and the aberration and, in particular, astigmatism and refractive errors are not determined by only one curvature but rather by both principle curvatures.

Therefore, fulfilling the condition for the course of the curvature of a meridian set forth in EP 0 379 976 B1 is not sufficient for constructing a surface according to the state of the art.

SUMMARY OF THE INVENTION

The object of the present invention is to provide a monofocal ophthalmic lens having two aspherical surfaces (a front surface and a rear surface) of which at least one surface has the identical principle radii of curvature in the apex, in which there not only is a balance between the reduction of the critical thickness, i.e., of the center thickness in lenses with positive power and of the peripheral thickness in lenses with negative power, and the reduction of aberrations but the reduction of both values is as great as possible.

An element of the present invention is that it was understood that both the critical thickness and the aberrations, i.e., in particular the astigmatism and the refracting error can be reduced more greatly in a monofocal ophthalmic lens having two aspherical surfaces (a front surface and a rear surface) than as is known from the prior art, in that the average surface refracting power of at least one of the front and rear surfaces outside the respective apex is defined by the formula:

$$B_f = (n-1)/2 * (1/R_1 + 1/R_2)$$

wherein n: is the refractive index of the lens medium, $R_1$: is the radius of principle curvature 1 in a point of at least one of the front and rear surfaces in a first principle plane, and $R_2$: is the radius of principle curvature 2 in the point of the at least one of the front and rear surfaces in a second principle plane, and wherein the average surface refracting power of the points on the at least one of the front and rear surfaces is the function of the distance h at a constant azimuthal angle of Ω of each point from the apex, and this function comprises an extreme value and/or the value 0. It is preferable if both an extreme value and the value 0 occur on each meridian.

By means of this invented design it can be achieved that if the critical thickness is very small the astigmatism ast and the refractive error ref in a central region, i.e. in a region having a radius of approximately 20 mm about the apex, assume very small values, i.e. values under 0.1 dpt.

Even in the ring-shaped region adjacent thereto having a radius of up to 30 mm both aberrations only reach values that would still permit direct vision in this region. Even in the outer region, i.e. in the region in which the radius is larger than 30 mm, direct vision is still possible, indirect vision however has practically no limitations.

In ophthalmic lenses with a negative refractive power in which the peripheral thickness is the critical thickness, the latter can be reduced by up to 30% compared to conventional ophthalmic lenses with only an aspherical surface. Even in lenses with a positive refractive power in which the center thickness is already greatly reduced by using an aspherical surface compared to conventional spherical lenses, the center thickness can be further reduced by approximately 10%.

The invented concept is suited, as it was surprisingly discovered, both for ophthalmic lenses with a positive power and ophthalmic lenses with a negative power. The advantages of the present invention becomes especially evident in ophthalmic lenses whose overall power ranges between −10 dpt and +8 dpt.

In any event, it is preferred if the mentioned invented conditions are maintained for the average surface refracting power for points on both aspherical surfaces. It is further preferred if both an extremal value and a zero point of the average surface refracting power occur.

In the case of a purely spherical prescription, the invented ophthalmic lens can have two rotationally symmetrical surfaces. In the case of an additional cylindrical prescription, one surface can be an atoric surface, thus a surface which has different powers in different principle planes. The other surface can be a rotationally symmetrical surface or a surface which although it has the identical principle radii of curvature in the apex, its principle curvatures differ in the peripheral region.

In the invented ophthalmic lens, the difference Δd between the maximum and minimum thickness of the ophthalmic lens is a function f of the spherical power sph, of the astigmatic power cyl, of the refractive index n and of the lens diameter $\phi$, with the function f the following applies:

$\Delta d = f(sph, cyl, n, \phi) \leq a + b*(n-1.5) + c*(\phi - 66 \text{ mm})$ with $a = f'(sph, cyl) = a1 + b1*|sph + 0.5*cyl|$
$b = f''(sph, cyl) = a2 + b2*|sph + 0.5*cyl|$
$c = f'''(sph, cyl) = b3*|sph + 0.5*cyl|$ The different coefficients are selected according to the prescription:

For example for the following prescriptions applies sph+ 0.5*cyl≤−1.0 dpt, and a1≤−0, 3 mm and b1≤1.2 mm/dpt.

Particularly preferred is if for the coefficients are:
sph+0.5*cyl≤−1.0 dpt, and
a1=−0.4 mm and b1=1.1 mm/dpt.

For the prescriptions sph+0.5*cyl≥2 dpt in particular applies a1≤−0.05 mm and b1≤1.05 mm/dpt.

Particularly preferred is if a1=−0.2 mm and b1=1.05 mm/dpt.

In any event, for the other coefficients a2, b2 and b3 applies a2=−2 mm
b2=−0.2 mm/dpt
b3=0.04 m.

In another embodiment of the present invention, the astigmatism ast and the refraction aberration ref have very small values in a central region about the apex having a radius of approximately 20 mm, in an adjacent region with a maximum radius of approximately 30 mm, the values are larger but still suited for direct vision, and in a region with radius of more than 30 mm, values are reached that indirect vision is still possible in this region.

In this case applies:
ast=ast(s)≤a11+b11+s
ref=ref(s)≤a21+b22*s s being with regard to the value the stronger principle section power of the prescription.

DETAILS OF THE PREFERRED EMBODIMENTS

Figure 1:
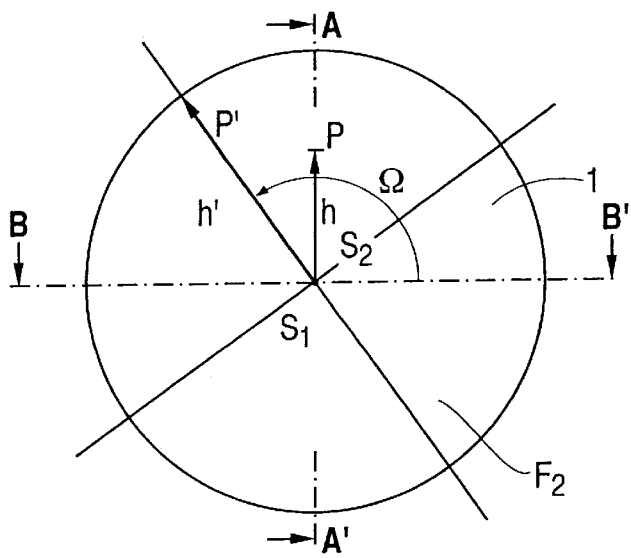
FIG. 1 is a cross sectional view in a plane perpendicular to the optical axis showing an embodiment of an monofocal ophthalmic lens according to the invention.

FIG. 1 shows a cross sectional view in a plane of an embodiment of an monofocal ophthalmic lens according to the invention, wherein numeral 1 denotes the monofocal ophthalmic lens according to the invention Because the view is from the rear side of the lens 1, the view is on the rear surface $F_2$ of the lens 1. In the middle of lens 1 there is an apex $S_2$ laying on the rear surface $F_2$. The planes defined by the axis A—A' and by the axis B—B', which are perpendicular to the plane of FIG. 1, denote examples for principle planes in which principle radii with reference to a point lay. Numeral P denotes an example for a point laying on the front surface $F_1$ of the monofocal ophthalmic lens 1. This point still lays in the principle plane defined by A—A' and laying perpendicular to the plane of FIG. 1. A point P' is a further example again laying on the front surface $F_1$ of the monofocal ophthalmic lens 1.

With the optical axis through apexes $S_1$ and $S_2$ and the axis B—B' in the plane of FIG. 1 the azimuthal angle of Q for a point is defined as an angle between the axis B—B' and the projection of vectors such as vectors $S_1>P$ or $S_1>P'$ in the plane of FIG. 1. The distances h or h' in FIG. 1 is defined by the length of projection of vectors $S_1>P$ respectively $S_1>P'$ in the plane of FIG. 1.

Figure 2:
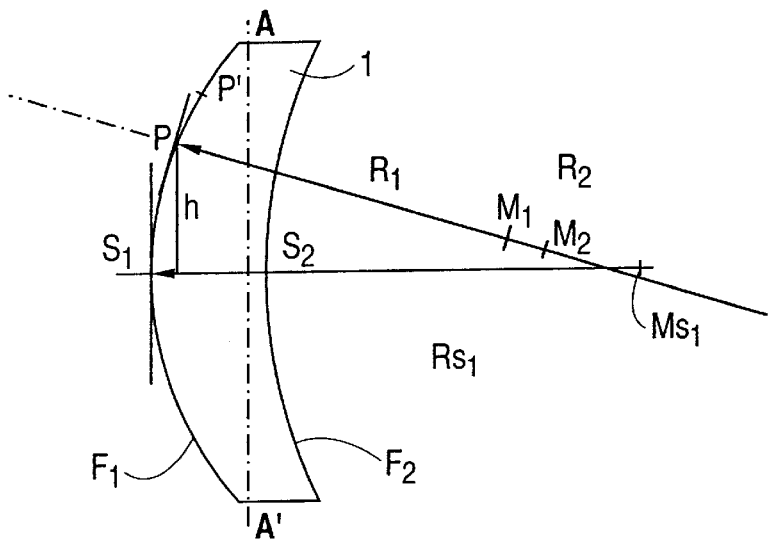
FIG. 2 is a cross sectional view along a plane defined by an axis A—A' of the embodiment of the monofocal ophthalmic lens according to FIG. 1, the plane being perpendicular to the plane of FIG. 1.

FIG. 2 shows a cross sectional view along the plane defined by the axis A—A' of the embodiment of the monofocal ophthalmic lens according to FIG. 1, which plane is perpendicular to the plane of FIG. 1. The view in FIG. 2 is from the left side.

Figure 3:
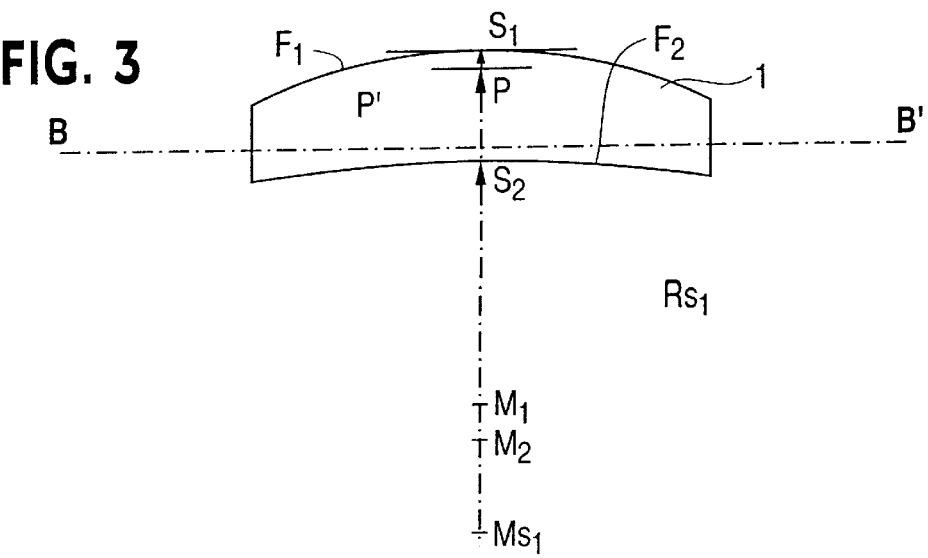
FIG. 3 is a cross sectional view along a plane defined by an axis B—B' of the embodiment of the monofocal ophthalmic lens according to FIG. 1, the plane being perpendicular to the plane of FIG. 1.

FIG. 3 is a cross sectional view along the plane defined by the axis B—B' of the embodiment of the monofocal ophthalmic lens according to FIG. 1, which plane is perpendicular to the plane of FIG. 1. The view of FIG. 3 is from the top.

Especially with the two views of FIGS. 2 and 3 the properties of the radii of principle curvature with reference to apex $S_1$, and points P and P' are illustrated.

In both views of FIGS. 2 and 3, the front surface $F_1$ of the ophthalmic lens 1 can be seen. For example apex $S_1$ which lays on the front surface $F_1$ has identical radii of principle curvature. This is illustrated by the first principle plane defined by the A—A' which is perpendicular to the plane of FIG. 1 and in which the center with reference to the first radius of principle curvature is $M_{S1}$. In the second principle plane defined by the axis B—B' and which is perpendicular to the plane of FIG. 1, the center with reference to the second radius of principle curvature is again $M_{S1}$. Thus these respective radii are identical having the same length of $R_{S1}$ and the same center $M_{S1}$ and laying on the same straight line.

Accordingly, $S_1$ is an ombilic point.

With reference to a point P the definition of corresponding radii of principle curvature $R_1$ and $R_2$ in the respective principle planes is illustrated.

For a better understanding point P lays on the front surface $F_1$ of the ophthalmic lens outside the apex $S_1$ in the principle plane defined by the axis A—A' which is perpendicular to the plane of FIG. 1.

In this principle plane, the radius of principle curvature $R_1$ is shown in FIG. 2. This radius of principle curvature $R_1$ lays on a straight line perpendicular to the tangential plane to the surface in point P in this principle plane. $R_1$ starts in its center $M_1$.

The other principle plane with reference to point P comprises this straight line perpendicular to the tangential plane to the surface in point P in the principle plane defined by the axis A—A' which is perpendicular to the plane of FIG. 1. This second principle plane is furthermore perpendicular to the first principle plane. In FIG. 3 the radius of principle curvature $R_2$ and its center $M_2$ can be seen only in projection into the plane defined by the axis B—B' which is perpendicular to the plane of FIG. 1.

The radii of principle curvature $R_1$ and $R_2$ with reference to point P lay on the same straight line as can be seen in FIG. 2. But in contrast to the apex $S_1$ the respective centers $M_1$ and $M_2$ are not identical.

To conclude the discussed respective radii of principle curvature $R_1$ and $R_2$ define the average surface refracting power with reference to a point P.

In the FIGS. 1 to 3, an arbitrary point such as P' is shown. To this point, principle planes for the respective radii of principle curvature can be allocated. The resulting radii define the average surface refracting power in this point.

At the end the above defined average surface refracting power is a function of two parameters concerning the position of the respective arbitrary point on the surface (the front and/or the rear surface). These parameters are the distance h and the azimuthal angle $\Omega$ as defined above. In FIG. 2 furthermore the distance h with reference to point P is illustrated in the plane defined by the axis A—A' which is perpendicular to the plane of FIG. 1

Figure 4:
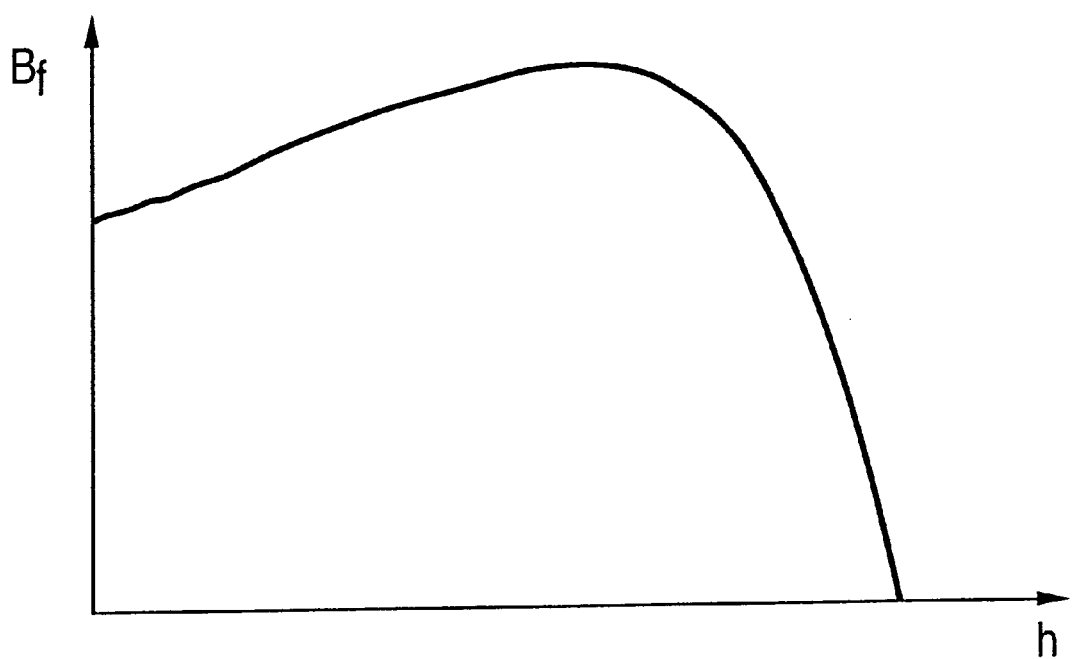
FIG. 4 shows an example of a curve representing the average surface refracting power Bf of a surface point P as a function of distance h, according to the present invention.

FIG. 4 shows a curve of an example of the average surface refracting power $B_f$ of a surface point P as a function of distance h, according to the present invention wherein the curve shows an extreme value and the value 0.

The scope of the invention is not limited by this embodiment.

What is claimed is:

1. A monofocal ophthalmic lens comprising:
 a front and a rear surface, each of which is aspherical,
 at least one of the front and rear surfaces has identical principle of radii of curvature in the apex,
 the average surface refracting power of at least one of the front and rear surfaces is defined by the formula:

$$B_f=(n-1)/2*(1/R_1+1/R_2)$$

wherein
 n: is the refractive index of the lens medium,
 $R_1$: is the radius of principle curvature 1 in a point of at least one of the front and rear surfaces in a first principle plane, and
 $R_2$: is the radius of principle curvature 2 in the point of the at least one of the front and rear surfaces in a second principle plane, and
 wherein the average surface refracting power of points on the at least one of the front and rear surfaces is the function of the distance h at constant azimuthal angle of $\Omega$ of each point from the apex, and the function includes at least one of an extreme value and a value 0.

2. An ophthalmic lens according to claim 1, wherein on both of said front and rear surfaces the points outside the respective apex comprising said average surface refracting power as the function of the distance h from the apex have at least one of the extreme value and the value 0.

3. An ophthalmic lens according to claim 1 or 2, wherein both said front and rear surfaces are rotationally symmetrical surfaces.

4. An ophthalmic lens according to claim 1 or 2, wherein one surface has different powers in different principle planes in such a manner that said ophthalmic lens has astigmatic power.

5. An ophthalmic lens according to claim 1, wherein a difference $\Delta d$ between the maximum (dmax) and minimum (dmin) thickness of said ophthalmic lens is a function f of spherical power sph, of astigmatic power cyl, of said refractive index n and lens diameter $\phi$.

6. An ophthalmic lens according to claim 5, wherein for said function f the following applies:

$\Delta d=f(sph,cyl,n,\phi)<a+b*(n-1.5)+c*(\phi-66 \text{ mm})$ with
 $a=f'(sph,cyl)=a1+b1*|sph+0.5*cyl|$
 $b=f'(sph,cyl)=a2+b2*|sph+0.5*cyl|$
 $c=f''(sph,cyl)=b3*|sph+0.5*cyl|$.

7. An ophthalmic lens according to claim 6, wherein for prescriptions
 sph+0.5* cyl<−1.0 dpt
 applies: a1<−0.3 mm and b1≦1.2 mm/dpt.

8. An ophthalmic lens according to claim 6, wherein for prescriptions
 sph+0.5* cyl<−1.0 dpt
 applies: a1=−0.4 mm and b1=1.1 mm/dpt.

9. An ophthalmic lens according to claim 6, wherein for prescriptions sph+0.5 * cyl>2 dpt
 applies: a1<−0.05 mm and b1<1.05 mm/dpt.

10. An ophthalmic lens according to claim 9, wherein for prescriptions
 sph+0.5 * cyl>2 dpt
 applies: a1=−0.2 mm and b1=1.05 mm/dpt.

11. An ophthalmic lens according to one of the claims 6 to 10, wherein
 a2=−2 mm
 b2=−0.2 mm/dpt
 b3=0.04 m
applies.

12. An ophthalmic lens according to claim 3, wherein a difference $\Delta d$ between the maximum (dmax) and minimum (dmin) thickness of said ophthalmic lens is a function f of spherical power sph, of astigmatic power cyl, of said refractive index n and lens diameter.

13. An ophthalmic lens according to claim 4, wherein a difference $\Delta d$ between the maximum (dmax) and minimum (dmin) thickness of said ophthalmic lens is a function f of spherical power sph, of astigmatic power cyl, of said refractive index n and lens diameter $\phi$.

14. An ophthalmic lens according to one of the claims 1 2, 6, 7, 8, 9, 10, 12 and 13, wherein astigmatism ast and refracting aberration ref have first values in a center region about the apex having a radius of approximately 20 mm, and have in the adjacent region having a maximum radius of approximately, 30 mm, second values larger than the first values and enabling direct vision.

15. An ophthalmic lens according to claim 14, wherein
 ast=ast(s)<a11+b11+s
 ref=ref(s)<a21+b22*s
applies with s being with regard to the value, the stronger principle section power of the prescription.

16. An ophthalmic lens according to claim 3, wherein astigmatism ast and refracting aberration ref have first values in a center region about the apex having a radius of approximately 20 mm, and have in the adjacent region having a maximum radius of approximately, 30 mm, second values larger than the first values and enabling direct vision.

17. An ophthalmic lens according to claim 4, wherein astigmatism ast and refracting aberration ref have first values in a center region about the apex having a radius of approximately 20 mm, and have in the adjacent region having a maximum radius of approximately, 30 mm, second values larger than the first values direct vision, and in the region having a radius of more than 30 mm, values are reached that in said region direct vision is still possible, indirect vision however practically without limitations.

18. An ophthalmic lens according to claim 5, wherein astigmatism ast and refracting aberration ref have first values in a center region about the apex having a radius of approximately 20 mm, and have in the adjacent region having a maximum radius of approximately, 30 mm, second values larger than the first values direct vision, and in the region having a radius of more than 30 mm, values are reached that in said region direct vision is still possible, indirect vision however practically without limitations.

19. An ophthalmic lens according to claim 11, wherein astigmatism ast and refracting aberration ref have first values in a center region about the apex having a radius of approximately 20 mm, and have in the adjacent region having a maximum radius of approximately, 30 mm, second values larger than the first values direct vision, and in the region having a radius of more than 30 mm, values are reached that in said region direct vision is still possible, indirect vision however practically without limitations.

20. An ophthalmic lens according claim 12, wherein $ast = ast(s) \leq a11 + b11 + s$ $ref = ref(s) \leq a21 + b22 * s$ applies with s being with regard to the value, the stronger principle section power of the prescription.

* * * * *